(12) United States Patent
Fujimoto et al.

(10) Patent No.: US 11,527,392 B2
(45) Date of Patent: Dec. 13, 2022

(54) MASS SPECTROMETRY DEVICE AND MASS SPECTROMETRY METHOD

(71) Applicant: SHIMADZU CORPORATION, Kyoto (JP)

(72) Inventors: Minoru Fujimoto, Kyoto (JP); Hideki Yamamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/057,964

(22) PCT Filed: May 29, 2018

(86) PCT No.: PCT/JP2018/020520
§ 371 (c)(1),
(2) Date: Nov. 23, 2020

(87) PCT Pub. No.: WO2019/229839
PCT Pub. Date: Dec. 5, 2019

(65) Prior Publication Data
US 2021/0305034 A1 Sep. 30, 2021

(51) Int. Cl.
*H01J 49/00* (2006.01)
*H01J 49/02* (2006.01)
*H01J 49/40* (2006.01)
*G01N 27/62* (2021.01)

(52) U.S. Cl.
CPC .......... *H01J 49/0031* (2013.01); *G01N 27/62* (2013.01); *H01J 49/02* (2013.01); *H01J 49/40* (2013.01)

(58) Field of Classification Search
CPC ....... H01J 49/0031; H01J 49/02; H01J 49/045
USPC .......................................................... 250/282
See application file for complete search history.

(56) References Cited

U.S. PATENT DOCUMENTS

| | | | | |
|---|---|---|---|---|
| 6,590,203 | B2* | 7/2003 | Kato | H01J 49/005 |
| | | | | 250/282 |
| 9,897,581 | B1* | 2/2018 | Prakash | H01J 49/0031 |
| 10,615,016 | B2* | 4/2020 | Eiler | H01J 49/425 |
| 11,031,218 | B2* | 6/2021 | Zhang | H01J 49/40 |
| 2008/0283740 | A1 | 11/2008 | Hashiba et al. | |

(Continued)

FOREIGN PATENT DOCUMENTS

| JP | 2008-286568 A | 11/2008 |
|---|---|---|
| JP | 2010-19655 A | 1/2010 |

OTHER PUBLICATIONS

International Search Report for PCT/JP2018/020520 dated Aug. 14, 2018 (PCT/ISA/210).

(Continued)

*Primary Examiner* — Wyatt A Stoffa
(74) *Attorney, Agent, or Firm* — Sughrue Mion, PLLC

(57) ABSTRACT

A precursor ion selection processing unit (22) sequentially selects precursor ions having different mass-to-charge ratios, and causes an MS/MS spectrum data acquisition processing unit (23) to acquire MS/MS spectrum data corresponding to each precursor ion. The precursor ion selection processing unit (22) sequentially selects the precursor ion having a mass-to-charge ratio which is not included in a predetermined range with respect to a mass-to-charge ratio of the precursor ion for which the MS/MS spectrum data has already been acquired.

2 Claims, 5 Drawing Sheets

(56) References Cited

U.S. PATENT DOCUMENTS

2016/0329197 A1* 11/2016 Yamaguchi ............. H01J 49/40
2022/0049024 A1* 2/2022 Kean ........................ C08K 7/16

OTHER PUBLICATIONS

Written Opinion for PCT/JP2018/020520 dated Aug. 14, 2018 (PCT/ISA/237).
Communication dated Oct. 5, 2021, issued by the Japanese Patent Office in application No. 2020-522426.

* cited by examiner

| 461 | → EXECUTE |
| 510 | → EXECUTE |
| 542 | → EXECUTE |
| 459 | → NOT EXECUTE |
| 479 | → EXECUTE |
| 496 | → EXECUTE |
| 519 | → EXECUTE |
| 463 | → NOT EXECUTE |
| 481 | → NOT EXECUTE |
| 498 | → NOT EXECUTE |
| 512 | → NOT EXECUTE |
| 521 | → NOT EXECUTE |

FIG.4

MASS SPECTROMETRY DEVICE AND MASS SPECTROMETRY METHOD

CROSS REFERENCE TO RELATED APPLICATIONS

This application is a National Stage of International Application No. PCT/JP2018/020520 filed May 29, 2018.

TECHNICAL FIELD

The present invention relates to a mass spectrometry device and a mass spectrometry method which select a precursor ion on the basis of MS spectrum data obtained by ionizing a sample and performing mass spectrometry, and acquire MS/MS spectrum data by cleaving the selected precursor ion and performing mass spectrometry.

BACKGROUND ART

In some cases, sample components are separated by liquid chromatography, and each sample component is identified on the basis of $MS^n$ spectrum obtained by sequentially performing $MS^n$ analysis (n is a natural number) on each separated sample component (for example, refer to Patent Document 1 below). In this case, first, MS spectrum data is acquired by performing mass spectrometry (MS analysis) on the ionized sample components. Then, a precursor ion is selected on the basis of the measured MS spectrum data, and MS/MS spectrum data is acquired by cleaving the selected precursor ion and performing mass spectrometry (MS/MS analysis).

When selecting a precursor ion, each peak intensity is compared to a predetermined threshold in the MS spectrum data. Then, the ion corresponding to a mass-to-charge ratio having a peak intensity equal to or higher than the threshold is selected as the precursor ion. At this time, if there are a plurality of mass-to-charge ratios having a peak intensity equal to or higher than the threshold, a plurality of precursor ions are selected.

PRIOR ART DOCUMENTS

Patent Documents

Patent Document 1: Japanese Patent Laid-Open No. 2010-19655

SUMMARY OF THE INVENTION

Problems to be Solved by the Invention

In a case where a plurality of precursor ions are selected, even when their mass-to-charge ratios are close to each other, precursor ions corresponding to the respective mass-to-charge ratios are selected, and the MS/MS spectrum data is acquired on the basis of each of the precursor ions. In this case, since the acquired MS/MS spectrum data has an approximate result, the MS/MS spectrum data is acquired more than necessary, resulting in wasting time and storage area.

The present invention has been made in view of the above circumstances, and an object of the present invention is to provide a mass spectrometry device and a mass spectrometry method which can acquire the minimum required MS/MS spectrum data.

Means for Solving the Problems (1) A mass spectrometry device according to the present invention includes an MS spectrum data acquisition processing unit, a precursor ion selection processing unit, and an MS/MS spectrum data acquisition processing unit. The MS spectrum data acquisition processing unit acquires MS spectrum data by ionizing a sample and performing mass spectrometry. The precursor ion selection processing unit selects a precursor ion on the basis of the MS spectrum data. The MS/MS spectrum data acquisition processing unit acquires MS/MS spectrum data by cleaving the selected precursor ion and performing mass spectrometry. The precursor ion selection processing unit sequentially selects precursor ions having different mass-to-charge ratios, causes the MS/MS spectrum data acquisition processing unit to acquire MS/MS spectrum data corresponding to each of the precursor ions, and sequentially selects the precursor ion having a mass-to-charge ratio which is not included in a predetermined range with respect to a mass-to-charge ratio of the precursor ion for which the MS/MS spectrum data has already been acquired.

With such a configuration, when the precursor ions having different mass-to-charge ratios are sequentially selected and the MS/MS spectrum data corresponding to each precursor ion is acquired, the ions having the mass-to-charge ratios included in the predetermined range with respect to the mass-to-charge ratios of the precursor ions for which the MS/MS spectrum data has already been acquired are not selected. Accordingly, it is possible to acquire the minimum required MS/MS spectrum data, and it is possible to prevent unnecessary acquisition of approximate MS/MS spectrum data. As a result, it is possible to prevent wasting time and storage area.

(2) The mass spectrometry device may further include a display processing unit that displays the MS/MS spectrum data acquired by the MS/MS spectrum data acquisition processing unit. In this case, the display processing unit may display, as the MS/MS spectrum data corresponding to an ion which is not selected as the precursor ion by the precursor ion selection processing unit, the MS/MS spectrum data corresponding to the precursor ion including the mass-to-charge ratio of the ion within the predetermined range.

With such a configuration, even for the ion which is not selected as the precursor ion, as the MS/MS spectrum data corresponding to the ion, the MS/MS spectrum data corresponding to the precursor ion including the mass-to-charge ratio of the ion within the predetermined range is displayed. Therefore, it is possible to perform analysis on the ion which is not selected as the precursor ion by confirming the displayed MS/MS spectrum data.

(3) When the MS/MS spectrum data corresponding to the ion which is not selected as the precursor ion by the precursor ion selection processing unit is displayed, the display processing unit may display a retention time in a case of assuming that the ion is selected as the precursor ion and the MS/MS spectrum data is acquired.

With such a configuration, for the ion which is not selected as the precursor ion, as the MS/MS spectrum data corresponding to the ion, not only the MS/MS spectrum data corresponding to the precursor ion including the mass-to-charge ratio of the ion within the predetermined range is displayed, but also the retention time in a case of assuming that the ion is selected as the precursor ion and the MS/MS spectrum data is acquired is displayed. Therefore, it is possible to perform analysis in more detail on the ion which is not selected as the precursor ion by confirming the displayed MS/MS spectrum data and retention time.

(4) A mass spectrometry method according to the present invention includes an MS spectrum data acquisition step, a precursor ion selection step, and an MS/MS spectrum data acquisition step. In the MS spectrum data acquisition step, MS spectrum data is acquired by ionizing a sample and performing mass spectrometry. In the precursor ion selection step, a precursor ion is selected on the basis of the MS spectrum data. In the MS/MS spectrum data acquisition step, MS/MS spectrum data is acquired by cleaving the selected precursor ion and performing mass spectrometry. The precursor ion selection step sequentially selects precursor ions having different mass-to-charge ratios, causes the MS/MS spectrum data acquisition step to acquire MS/MS spectrum data corresponding to each of the precursor ion, and sequentially selects the precursor ion having a mass-to-charge ratio which is not included in a predetermined range with respect to a mass-to-charge ratio of the precursor ion for which the MS/MS spectrum data has already been acquired.

(5) The mass spectrometry method may further include a display step of displaying the MS/MS spectrum data acquired by the MS/MS spectrum data acquisition step. In this case, in the display step, the MS/MS spectrum data corresponding to the precursor ion including the mass-to-charge ratio of the ion within the predetermined range is displayed as the MS/MS spectrum data corresponding to the ion which is not selected as the precursor ion by the precursor ion selection step.

(6) When the MS/MS spectrum data corresponding to the ion which is not selected as the precursor ion by the precursor ion selection step is displayed, in the display step, a retention time in a case of assuming that the ion is selected as the precursor ion and the MS/MS spectrum data is acquired may be displayed.

Effects of the Invention

According to the present invention, it is possible to acquire the minimum required MS/MS spectrum data, and it is possible to prevent unnecessary acquisition of approximate MS/MS spectrum data.

BRIEF DESCRIPTION OF THE DRAWINGS

FIG. 4 is a diagram for describing a mode when a precursor ion is selected on the basis of the MS spectrum data illustrated in FIG. 3.

MODE FOR CARRYING OUT THE INVENTION

1. Schematic Configuration of Mass Spectrometry Device

Figure 1:
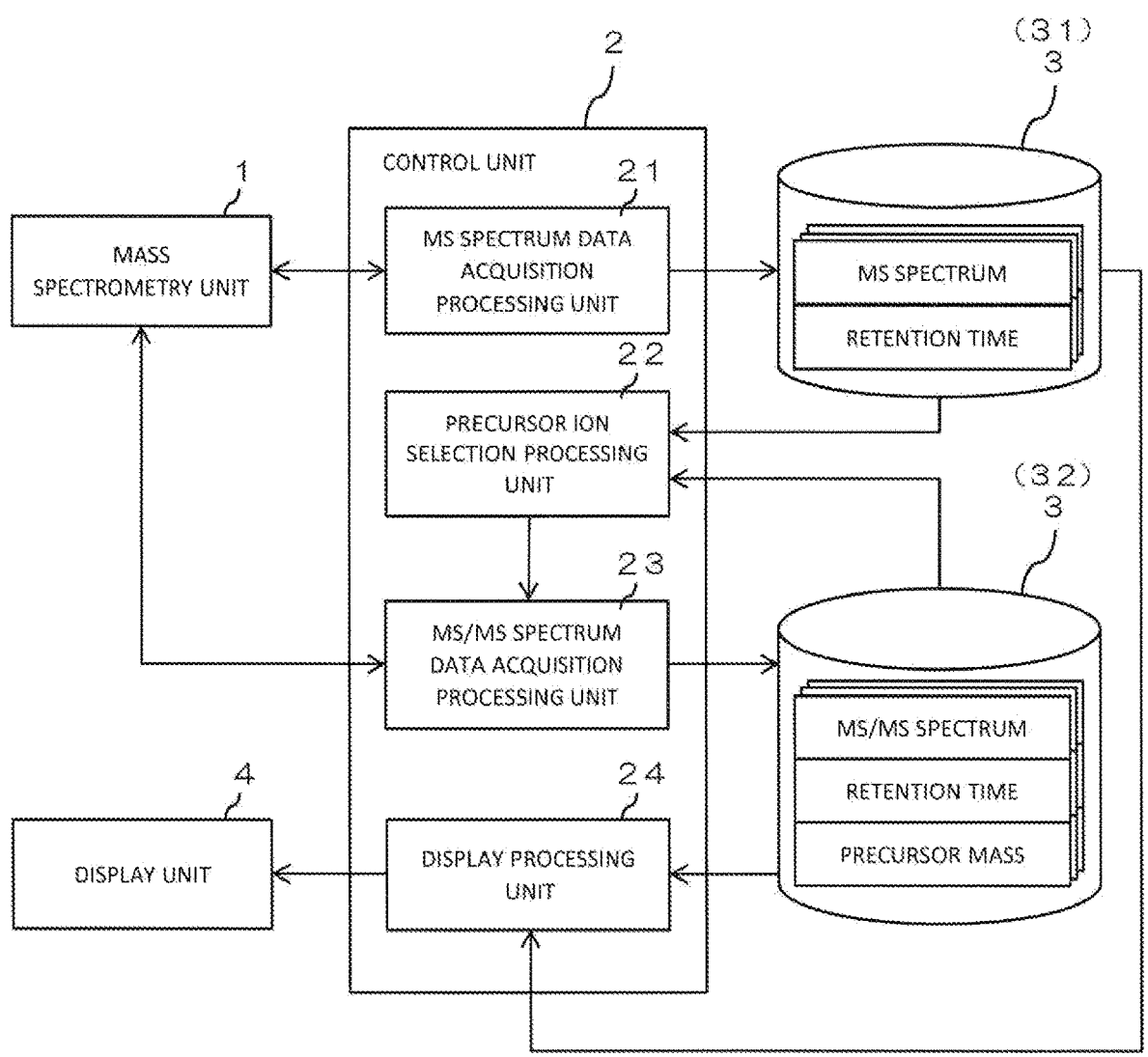
FIG. 1 is a block diagram illustrating a schematic configuration of a mass spectrometry device according to an embodiment of the present invention.

FIG. 1 is a block diagram illustrating a schematic configuration of a mass spectrometry device according to an embodiment of the present invention. The mass spectrometry device according to the present embodiment includes, for example, a mass spectrometry unit 1, a control unit 2, a storage unit 3, a display unit 4, and the like.

The mass spectrometry unit 1 ionizes the sample and performs mass spectrometry. The mass spectrometry unit 1 includes, for example, an ionization chamber, an ion trap, and an ion detector (which are not illustrated). The sample ionized in the ionization chamber is cleaved by collision-induced dissociation (CID) in the ion trap, and then detected by the ion detector.

The mass spectrometry unit 1 is composed of, for example, a time-of-flight mass spectrometer (TOFMS). In this type of mass spectrometry unit 1, ions accelerated by an electric field formed in a flight space are temporally separated according to the mass-to-charge ratios while flying in the flight space, and are sequentially detected by the ion detector. As a result, a relationship between the mass-to-charge ratio and a detection intensity in the ion detector is measured as a mass spectrum.

However, the mass spectrometry unit 1 is not limited to the one composed of TOFMS. In addition, as a method for ionizing the sample, various ionization methods such as electrospray ionization (ESI), atmospheric pressure chemical ionization (APCI), probe electrospray ionization (PESI) or matrix assisted laser desorption/ionization (MALDI) can be used.

In the present embodiment, $MS^n$ analysis (n is a natural number) is performed by repeatedly cleaving the ions captured in the ion trap and performing mass spectrometry, and thereby $MS^n$ spectrum data can be acquired. Specifically, the MS spectrum data is acquired by capturing the ionized sample in the ion trap, cleaving the captured ions, and performing mass spectrometry. Then, any of the ions is selected as the precursor ion on the basis of the MS spectrum data. Then, the MS/MS spectrum data is acquired by leaving only the selected precursor ion in the ion trap, cleaving the precursor ion, and performing mass spectrometry.

The control unit 2 includes, for example, a central processing unit (CPU). The control unit 2 functions as an MS spectrum data acquisition processing unit 21, a precursor ion selection processing unit 22, an MS/MS spectrum data acquisition processing unit 23, and a display processing unit 24 when the CPU executes a program. The storage unit 3 and the display unit 4 are electrically connected to the control unit 2.

The storage unit 3 is composed of, for example, a random access memory (RAM) or a hard disk. An MS spectrum data storage unit 31, an MS/MS spectrum data storage unit 32, and the like are assigned in the storage area of the storage unit 3. The display unit 4 is composed of, for example, a liquid crystal display.

The MS spectrum data acquisition processing unit 21 performs a process of acquiring the MS spectrum data on the basis of detection signals from the ion detector in the mass spectrometry unit 1 (MS spectrum data acquisition step). That is, the MS spectrum data is acquired by ionizing the sample, cleaving the ions, and performing mass spectrometry in the mass spectrometry unit 1. The acquired MS spectrum data is stored in the MS spectrum data storage unit 31 together with a retention time (retention time) corresponding to the MS spectrum data.

The precursor ion selection processing unit 22 performs a process of selecting the precursor ion on the basis of the acquired MS spectrum data (precursor ion selection step). That is, among the peaks included in the acquired MS spectrum data, the ion corresponding to the peak satisfying a predetermined condition is selected as the precursor ion. For example, as the above-mentioned predetermined condition, a peak having an intensity equal to or higher than a predetermined threshold may be selected as the precursor ion. In a case where there are a plurality of peaks having an intensity equal to or higher than the predetermined threshold, the ion may be selected as the precursor ion in order from the peak having the highest intensity.

The MS/MS spectrum data acquisition processing unit 23 performs a process of acquiring the MS/MS spectrum data by cleaving the selected precursor ion and performing mass spectrometry (MS/MS spectrum data acquisition step). The acquired MS/MS spectrum data is stored in the MS/MS spectrum data storage unit 32 together with the retention time (retention time) corresponding to the MS/MS spectrum data and the mass-to-charge ratio (precursor mass) of the corresponding precursor ion.

The precursor ion selection processing unit 22 sequentially selects precursor ions having different mass-to-charge ratios. The sequentially selected precursor ions are cleaved by the MS/MS spectrum data acquisition processing unit 23 and are subjected to mass spectrometry, and the MS/MS spectrum data corresponding to each precursor ion is acquired.

In the present embodiment, when the precursor ion selection processing unit 22 sequentially selects the precursor ions, the ion having a mass-to-charge ratio included in a predetermined range with respect to the mass-to-charge ratio of the precursor ion for which the MS/MS spectrum data has already been acquired is not selected as the precursor ion. That is, only the ion having a mass-to-charge ratio that is not included in a predetermined range with respect to the mass-to-charge ratio of the precursor ion for which the MS/MS spectrum data has already been acquired is selected as the precursor ion.

The display processing unit 24 performs a process of causing the display unit 4 to display the MS spectrum data and the MS/MS spectrum data (display step). In the present embodiment, the retention time corresponding to the MS spectrum data can be displayed on the display unit 4 together with the MS spectrum data. Further, the retention time corresponding to the MS/MS spectrum data and the mass-to-charge ratio (precursor mass) of the corresponding precursor ion can be displayed on the display unit 4 together with the MS/MS spectrum data.

2. Selection of Precursor Ion

Figure 2:
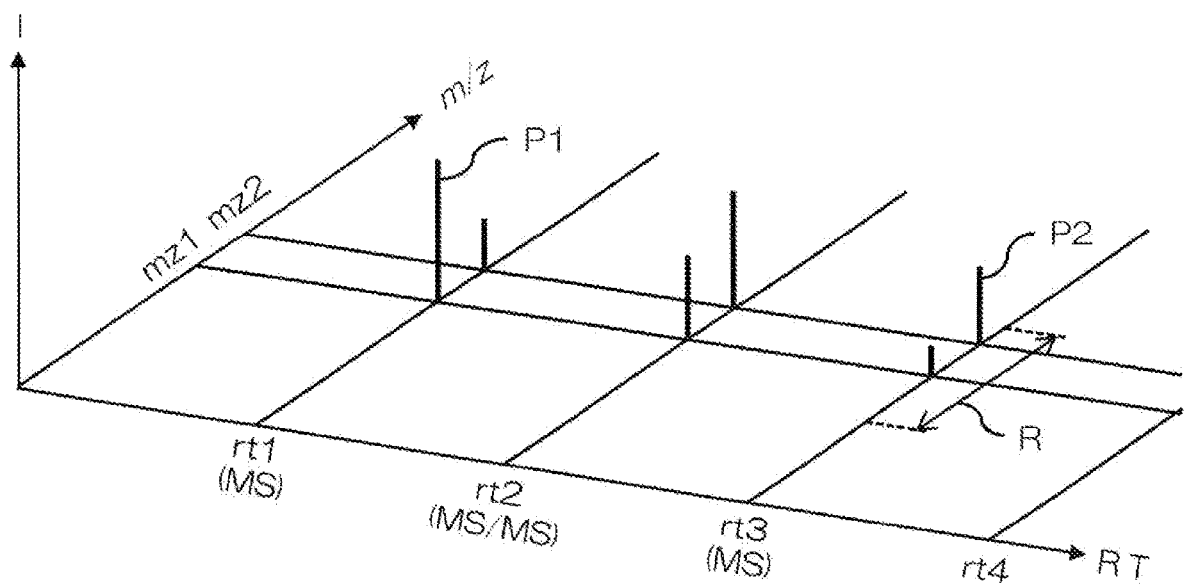
FIG. 2 is a diagram for describing a mode when a precursor ion selection processing unit selects a precursor ion.

FIG. 2 is a diagram for describing a mode when a precursor ion selection processing unit 22 selects the precursor ion.

In the example of FIG. 2, it is assumed that a peak P1 included in the MS spectrum data acquired at a retention time rt1 has an intensity equal to or higher than the above-mentioned predetermined threshold. In this case, an ion having a mass-to-charge ratio mz1 corresponding to the peak P1 is selected as the precursor ion, and the precursor ion is cleaved and is subjected to mass spectrometry. As a result, the MS/MS spectrum data is acquired at a retention time rt2.

Assuming that the subsequently acquired MS spectrum data at a retention time rt3 contains a peak P2 having an intensity equal to or higher than the above-mentioned predetermined threshold, normally, an ion having a mass-to-charge ratio mz2 corresponding to the peak P2 is selected as the precursor ion. However, in the present embodiment, if the mass-to-charge ratio mz2 is within a predetermined range R with respect to the mass-to-charge ratio mz1 of the precursor ion for which the MS/MS spectrum data has already been acquired, the ion having the mass-to-charge ratio mz2 is not selected as the precursor ion.

In this way, even in a case where there is an ion that is not selected as the precursor ion, a retention time rt4 in a case of assuming that the ion is selected as the precursor ion and the MS/MS spectrum data is acquired is stored in the storage unit 3.

3. Example

Figure 3:
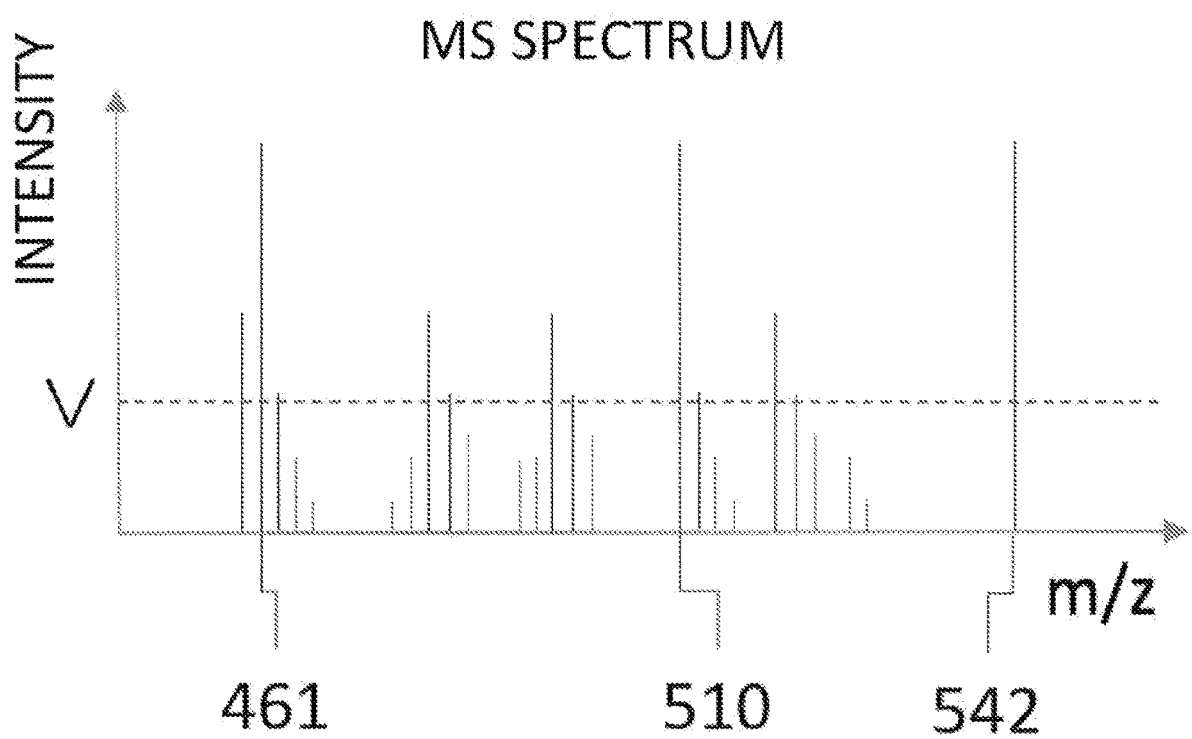
FIG. 3 is a diagram illustrating an example of MS spectrum data acquired by ionizing a certain sample and performing mass spectrometry.

FIG. 3 is a diagram illustrating an example of the MS spectrum data acquired by ionizing a certain sample and performing mass spectrometry. In this example, among a plurality of peaks included in the acquired MS spectrum data, an ion having a mass-to-charge ratio corresponding to each of 12 peaks having an intensity equal to or higher than a predetermined threshold V may be a candidate to be selected as the precursor ion.

In this example, the above-mentioned predetermined range (m/z width) R is ±5 Da. That is, an ion having a mass-to-charge ratio which is within ±5 Da with respect to the mass-to-charge ratio of the precursor ion for which the MS/MS spectrum data has already been acquired is not selected as the precursor ion, the process of acquiring the MS/MS spectrum data on the basis of the ion is not executed.

FIG. 4 is a diagram for describing a mode when the precursor ion is selected on the basis of the MS spectrum data illustrated in FIG. 3. In this example, since there are 12 peaks having an intensity equal to or higher than the predetermined threshold V, a process of selecting the ion in order from the peak having the highest intensity as the precursor ion is performed.

Specifically, ions having mass-to-charge ratios of "461", "510", and "542" are sequentially selected as precursor ions in order from the mass-to-charge ratio corresponding to the peak having the highest intensity, and each precursor ion is cleaved and is subjected to mass spectrometry, and the MS/MS spectrum data corresponding to each precursor ion is acquired. The mass-to-charge ratio corresponding to the peak having the next highest intensity is "459", but is within the range of ±5 Da with respect to the mass-to-charge ratio of "461" of the precursor ion for which the MS/IVIS spectrum data has already been acquired, and therefore, the ion having a mass-to-charge ratio of "459" is not selected as the precursor ion.

The next mass-to-charge ratios of "479", "496", and "519" are not within the range of ±5 Da with respect to the mass-to-charge ratio of the precursor ion for which the MS/MS spectrum data has already been acquired. Therefore, the ions of these mass-to-charge ratios are sequentially selected as the precursor ion, and the MS/MS spectrum data is acquired. However, since the next mass-to-charge ratios of "463", "481", "498", "512", and "521" are within the range of ±5 Da with respect to the mass-to-charge ratio of the precursor ion for which the MS/MS spectrum data has already been acquired, the ions of these mass-to-charge ratios are not selected as the precursor ion.

Figure 5A:
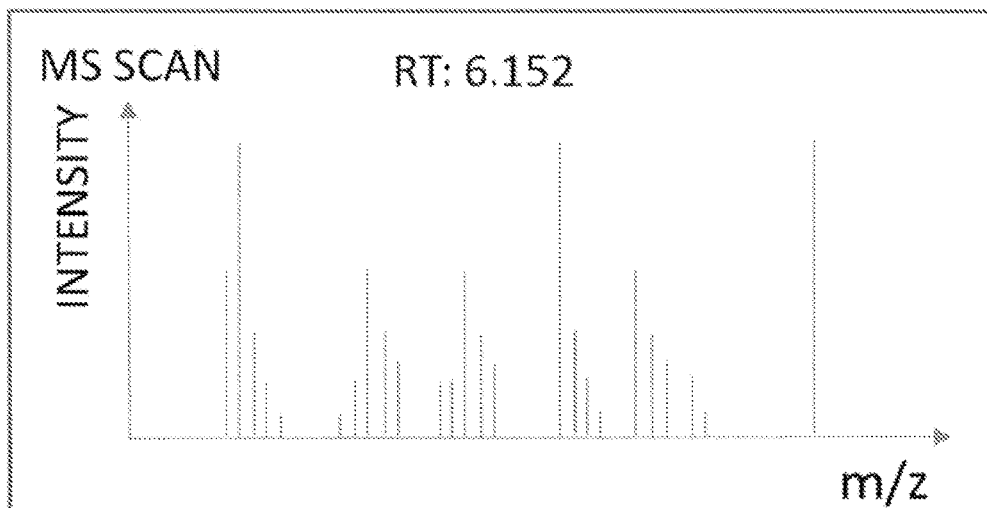
FIGS. 5A-5C are is a diagrams for describing a mode when a display processing unit displays MS spectrum data and MS/MS spectrum data on a display unit.
Figure 5B:
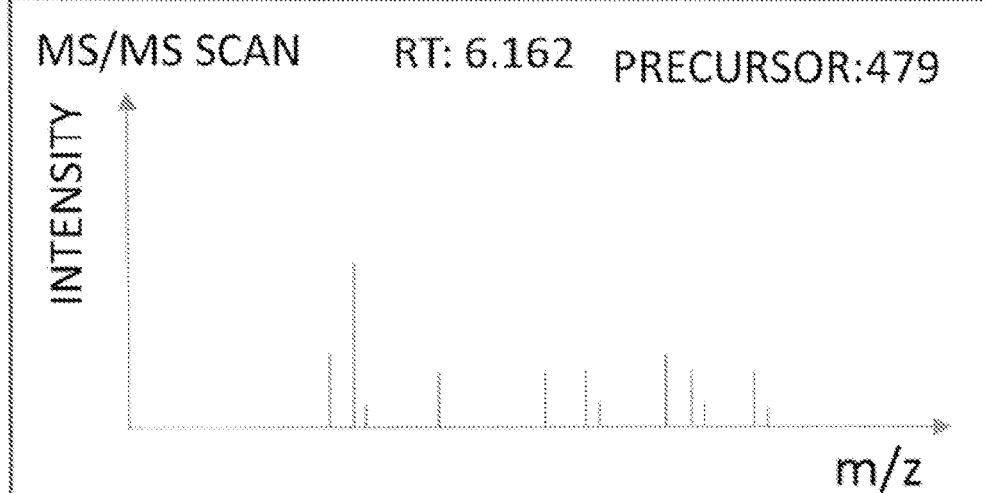
Figure 5C:
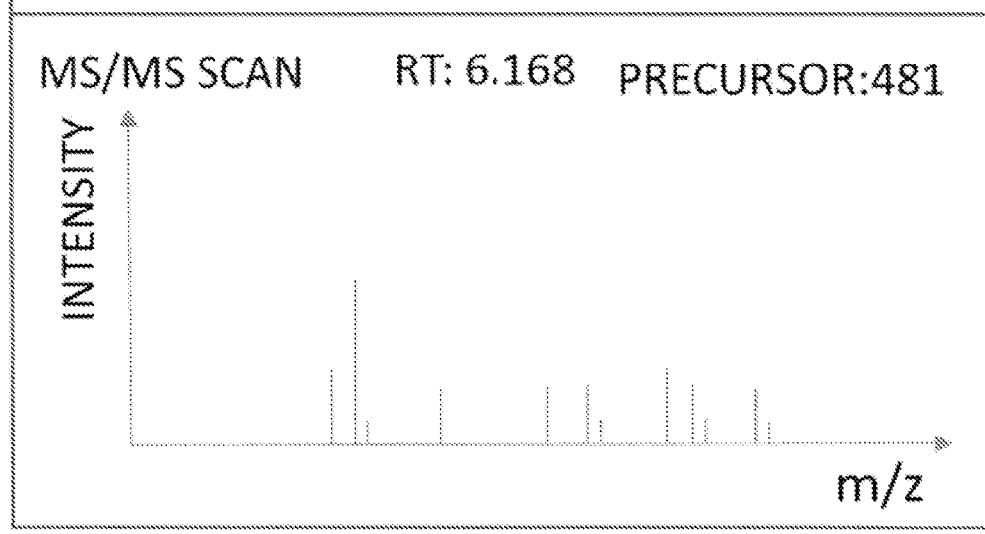

FIGS. 5A-5C are is diagrams for describing a mode when the display processing unit 24 displays the MS spectrum data and the MS/MS spectrum data on the display unit 4. In this example, one piece of MS spectrum data is displayed (FIG. 5A) and two pieces of MS/MS spectrum data are displayed (FIGS. 5B and 5C). The displays as illustrated in FIGS. 5A to 5C may be displayed simultaneously on the display unit 4 or may be displayed separately.

As illustrated in FIG. 5A, the MS spectrum data is displayed on the display unit 4 together with the retention time "6.152" corresponding to the MS spectrum data. As illustrated in FIGS. 5B and 5C, the MS/MS spectrum data is displayed on the display unit 4 together with the retention times "6.162" and "6.168" corresponding to the pieces of MS/MS spectrum data, and the mass-to-charge ratios "479" and "481" of the corresponding precursor ions.

Here, as illustrated in FIG. 4, the ion having a mass-to-charge ratio of "479" is selected as the precursor ion, and the MS/MS spectrum data is acquired. Accordingly, the actually acquired MS/MS spectrum data is displayed on the display unit 4 as illustrated in FIG. 5B. On the other hand, since the ion having a mass-to-charge ratio of "481" is within the range of ±5 Da with respect to the mass-to-charge ratio of "479" of the precursor ion for which the MS/MS spectrum data has already been acquired, as illustrated in FIG. 4, the ion having a mass-to-charge ratio of "481" is not selected as the precursor ion.

In this case, as illustrated in FIG. 5C, as the MS/MS spectrum data corresponding to the ion having a mass-to-charge ratio of "481" which is not selected as the precursor ion, the MS/MS spectrum data corresponding to the precursor ion (mass-to-charge ratio of "479") including the mass-to-charge ratio of "481" of the ion within the range of +5 Da is displayed on the display unit 4. That is, the MS/MS spectrum data (FIG. 5B) corresponding to the ion having a mass-to-charge ratio of "479" and the MS/MS spectrum data (FIG. 5C) corresponding to the ion having a mass-to-charge ratio of "481" are displayed on the display unit 4 as the same MS/MS spectrum data.

Further, as illustrated in FIG. 5C, when the MS/MS spectrum data corresponding to the ion (mass-to-charge ratio of "481") that is not selected as the precursor ion is displayed, a retention time of "6.168" in a case of assuming that the ion is selected as the precursor ion and the MS/MS spectrum data is acquired is displayed.

4. Effects (1) In the present embodiment, when the precursor ions having different mass-to-charge ratios are sequentially selected and the MS/MS spectrum data corresponding to each precursor ion is acquired, the ions having the mass-to-charge ratios ("459", "463", "481", "498", "512", and "521" in FIGS. 5A-5C) included in the predetermined range with respect to the mass-to-charge ratios ("461", "510", "542", "479", "496", and "519" in FIG. 4) of the precursor ions for which the MS/MS spectrum data has already been acquired are not selected. Accordingly, it is possible to acquire the minimum required MS/MS spectrum data, and it is possible to prevent unnecessary acquisition of approximate MS/MS spectrum data. As a result, it is possible to prevent wasting time and storage area.

(2) In the present embodiment, as illustrated in FIG. 5C, even for the ion (mass-to-charge ratio of "481") which is not selected as the precursor ion, as the MS/MS spectrum data corresponding to the ion, the MS/MS spectrum data corresponding to the precursor ion (mass-to-charge ratio of "479") including the mass-to-charge ratio of the ion within the predetermined range R is displayed. Therefore, it is possible to perform analysis on the ion which is not selected as the precursor ion by confirming the displayed MS/MS spectrum data.

(3) In the present embodiment, as illustrated in FIG. 5C, for the ion (mass-to-charge ratio of "481") which is not selected as the precursor ion, as the MS/MS spectrum data corresponding to the ion, not only the MS/MS spectrum data corresponding to the precursor ion including the mass-to-charge ratio of the ion within the predetermined range R is displayed, but also the retention time of "6.168" in a case of assuming that the ion is selected as the precursor ion and the MS/MS spectrum data is acquired is displayed. Therefore, it is possible to perform analysis in more detail on the ion which is not selected as the precursor ion by confirming the displayed MS/MS spectrum data and retention time.

DESCRIPTION OF REFERENCE SIGNS 1 mass spectrometry unit
2 control unit
3 storage unit
4 display unit
21 MS spectrum data acquisition processing unit
22 precursor ion selection processing unit
23 MS spectrum data acquisition processing unit
24 display processing unit
31 MS spectrum data storage unit
32 MS/MS spectrum data storage unit

The invention claimed is:

1. A mass spectrometry device comprising:
an MS spectrum data acquisition processing unit that acquires MS spectrum data by ionizing a sample and performing mass spectrometry;
a precursor ion selection processing unit that selects a precursor ion on the basis of the MS spectrum data;
an MS/MS spectrum data acquisition processing unit that acquires MS/MS spectrum data by cleaving the selected precursor ion and performing mass spectrometry; and
a display processing unit that displays the MS/MS spectrum data acquired by the MS/MS spectrum data acquisition processing unit,
wherein the precursor ion selection processing unit sequentially selects precursor ions having different mass-to-charge ratios, causes the MS/MS spectrum data acquisition processing unit to acquire MS/MS spectrum data corresponding to each of the precursor ions, and sequentially selects the precursor ion having a mass-to-charge ratio which is not included in a predetermined range with respect to a mass-to-charge ratio of the precursor ion for which the MS/MS spectrum data has already been acquired on the basis of the same MS spectrum data,
wherein the predetermined range is a range including the mass-to-charge ratio or a range of the mass-to-charge ratio of the precursor ion for which the MS/MS spectrum data has already been acquired,
wherein the display processing unit displays, as the MS/MS spectrum data corresponding to an ion which is not selected as the precursor ion by the precursor ion selection processing unit, the MS/MS spectrum data corresponding to the precursor ion including the mass-to-charge ratio of the ion within the predetermined range, and
the display processing unit displays a retention time of the ion which is not selected as the precursor ion.

2. A mass spectrometry method comprising:
an MS spectrum data acquisition step of acquiring MS spectrum data by ionizing a sample and performing mass spectrometry;
a precursor ion selection step of selecting a precursor ion on the basis of the MS spectrum data; and an MS/MS spectrum data acquisition step of acquiring MS/MS spectrum data by cleaving the selected precursor ion and performing mass spectrometry; and a display step of displaying the MS/MS spectrum data acquired by the MS/MS spectrum data acquisition step, wherein the precursor ion selection step sequentially selects precursor ions having different mass-to-charge ratios, causes the MS/MS spectrum data acquisition step to acquire MS/MS spectrum data corresponding to each of the precursor ions, and sequentially selects the precursor ion having a mass-to-charge ratio which is not included in a predetermined range with respect to a mass-to-charge ratio of the precursor ion for which the MS/MS spectrum data has already been acquired on the basis of the same MS spectrum data, wherein the predetermined range is a range including the mass-to-charge ratio or a range of the mass-to-charge ratio of the precursor ion for which the MS/MS spectrum data has already been acquired, wherein the display step displays, as the MS/MS spectrum data corresponding to an ion which is not selected as the precursor ion by the precursor ion selection step, the MS/MS spectrum data corresponding to the precursor ion including the mass-to-charge ratio of the ion within the predetermined range, and in the display step, a retention time of the ion which is not selected as the precursor ion is displayed.

\* \* \* \* \*